(12) United States Patent
Ying et al.

(10) Patent No.: US 9,152,616 B2
(45) Date of Patent: Oct. 6, 2015

(54) TEMPLATE-BASED PAGE LAYOUT FOR WEB CONTENT

(75) Inventors: Charles H. Ying, Piedmont, CA (US);
Marcos A. Weskamp, Palo Alto, CA (US)

(73) Assignee: Flipboard, Inc., Palo Alto, CA (US)

( * ) Notice: Subject to any disclaimer, the term of this patent is extended or adjusted under 35 U.S.C. 154(b) by 160 days.

(21) Appl. No.: 13/096,989

(22) Filed: Apr. 28, 2011

(65) Prior Publication Data

US 2012/0278704 A1 Nov. 1, 2012

(51) Int. Cl.
*G06F 17/24* (2006.01)
*G06F 17/22* (2006.01)
(52) U.S. Cl.
CPC ............ *G06F 17/24* (2013.01); *G06F 17/2247* (2013.01)
(58) Field of Classification Search
CPC ... G06F 17/211; G06F 17/24; G06F 17/2247; G06F 17/248; G06F 17/30905; G06F 17/3089; G06T 3/40
USPC .......... 715/243, 244, 247, 251, 253, 254, 256
See application file for complete search history.

(56) References Cited

U.S. PATENT DOCUMENTS

| | | | | |
|---|---|---|---|---|
| 5,911,146 | A * | 6/1999 | Johari et al. ................... | 715/234 |
| 7,191,398 | B2 * | 3/2007 | Nitta et al. ..................... | 715/205 |
| 7,246,311 | B2 * | 7/2007 | Bargeron et al. .............. | 715/251 |
| 7,272,789 | B2 * | 9/2007 | O'Brien ......................... | 715/247 |
| 7,343,549 | B2 * | 3/2008 | Ohashi et al. .................. | 715/243 |
| 7,401,289 | B2 * | 7/2008 | Lachhwani et al. ........... | 715/243 |
| 7,617,449 | B2 * | 11/2009 | Carlson et al. ................. | 715/243 |
| 8,180,157 | B2 * | 5/2012 | Grosvenor ..................... | 382/199 |
| 2006/0055635 | A1 * | 3/2006 | Choi ............................... | 345/60 |
| 2011/0157226 | A1 * | 6/2011 | Ptucha et al. .................. | 345/638 |

\* cited by examiner

*Primary Examiner* — Wilson Tsui
(74) *Attorney, Agent, or Firm* — Fenwick & West LLP

(57) ABSTRACT

Page layout of web content is performed based on templates. Publishers publish web content referred to as "sources." Each source comprises one or more assets from one or more asset types. The asset types include title, subtitle, byline, dateline, pull quote, image, video, audio, caption, and in-line text. A content processing system processes the sources using a conversion module and a rule database. The conversion module restructures a received source into a standardized format of the source, wherein each asset of the source is tagged with an asset type according to rules present in the rule database. A layout module interprets the standardized source, determines one or more templates from a template database to use for the layout of the assets of the source, and lays out the assets of the source based on the selected templates.

24 Claims, 10 Drawing Sheets

TEMPLATE-BASED PAGE LAYOUT FOR WEB CONTENT

BACKGROUND

1. Field of the Invention

This invention generally relates to performing page layout for web content, and specifically relates to converting web content for display on a client device using templates.

2. Description of the Related Art

Despite the (proliferation of lightweight, portable computing devices, including tablet PCs, even the owners of these devices continue to consume media from old-fashioned newspapers and magazines. In some cases, paper-based newspapers and magazines have been preferred because of the aesthetically pleasing layout of the content. One of the problems with web content is that because there is no concept of a standardized size or length for web pages, they frequently extend beyond the visible display area. As a result, a user must repeatedly scroll down or across a web page in order to read it. This presentation experience is particularly frustrating to users of devices with small screens, since they must spend considerable time scrolling back and forth or up and down to view the web page. This experience is entirely in contrast to paper-based newspapers and magazines that do not require, for example, horizontal scrolling to view blocks of text, or vertical scrolling to view embedded images—instead the user simply turns the page to continue experiencing the content.

The poor quality of the layout of web content on portable computing devices stems in part from the challenges associated with translating web content designed to be viewed on one display device to one or more different display devices. Each display device may have different dimensions and resolution. An article from a publisher may contain, for example, a title, subtitle, by-line, dateline, text, pull-quotes, images, and captions, which are collectively referred to as the assets of the article. To accommodate the variety of assets of an article, a sophisticated layout may be required. However, such a sophisticated layout may not translate well between display devices having different dimensions and resolution. Such a sophisticated layout has previously also been time consuming to create, since the articles had typically needed to be laid out manually by the publisher.

SUMMARY

In various embodiments, the present invention provides systems, methods, and computer-readable storage media for performing page layout of web content based on templates. Publishers publish web content such as text, images, video, or audio on web pages, web feeds, or other content distribution platforms, which are referred to herein as "sources." Each source comprises one or more assets from one or more asset types. The asset types include title, subtitle, byline, dateline, pull quote, image, video, audio, caption, and in-line text. A content processing system processes the sources received from the publishers using a conversion module and a rule database. The conversion module restructures a received source into a standardized format of the source, wherein each asset of the source is tagged with an asset type according to rules present in the rule database. A layout module interprets the standardized source, and selects one or more templates from a template database to use for the layout of the assets of the source. The layout module lays out the assets of the source based on the selected templates. In one embodiment, the layout module is on the client for performing client-side page layouts, and in another embodiment, the layout module is on a server.

In one implementation, to determine the template from a template database in which to place the assets of the source, candidate templates are identified and scored based on the assets of the source. Then a template from the candidate templates is selected based on the score. Embodiments of the invention include scoring templates based on calculating sub-scores for each slot of each candidate template. For example, the score of an image slot of a template can be determined by identifying the aspect ratio of an image asset of a source, scaling the image to fill the image slot, determining the area of the image to be cropped, and calculating the score of the image slot based on the degree of scaling and the area of the image to be cropped. As a further example, the score of frame can be based on how well a text asset fits in the frame.

In another implementation, populating the template with the assets of the source includes adding a text asset of a source to a frame of the selected template. If the text asset does not fit in the frame based on the height of the frame, the layout module incrementally fills the frame until it is full. Then, the layout module begins filling the next frame with the remaining content from the text asset.

The features and advantages described in this summary and the following detailed description are not all-inclusive. Many additional features and advantages will be apparent to one of ordinary skill in the art in view of the drawings, specification, and claims hereof.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Figure 1:
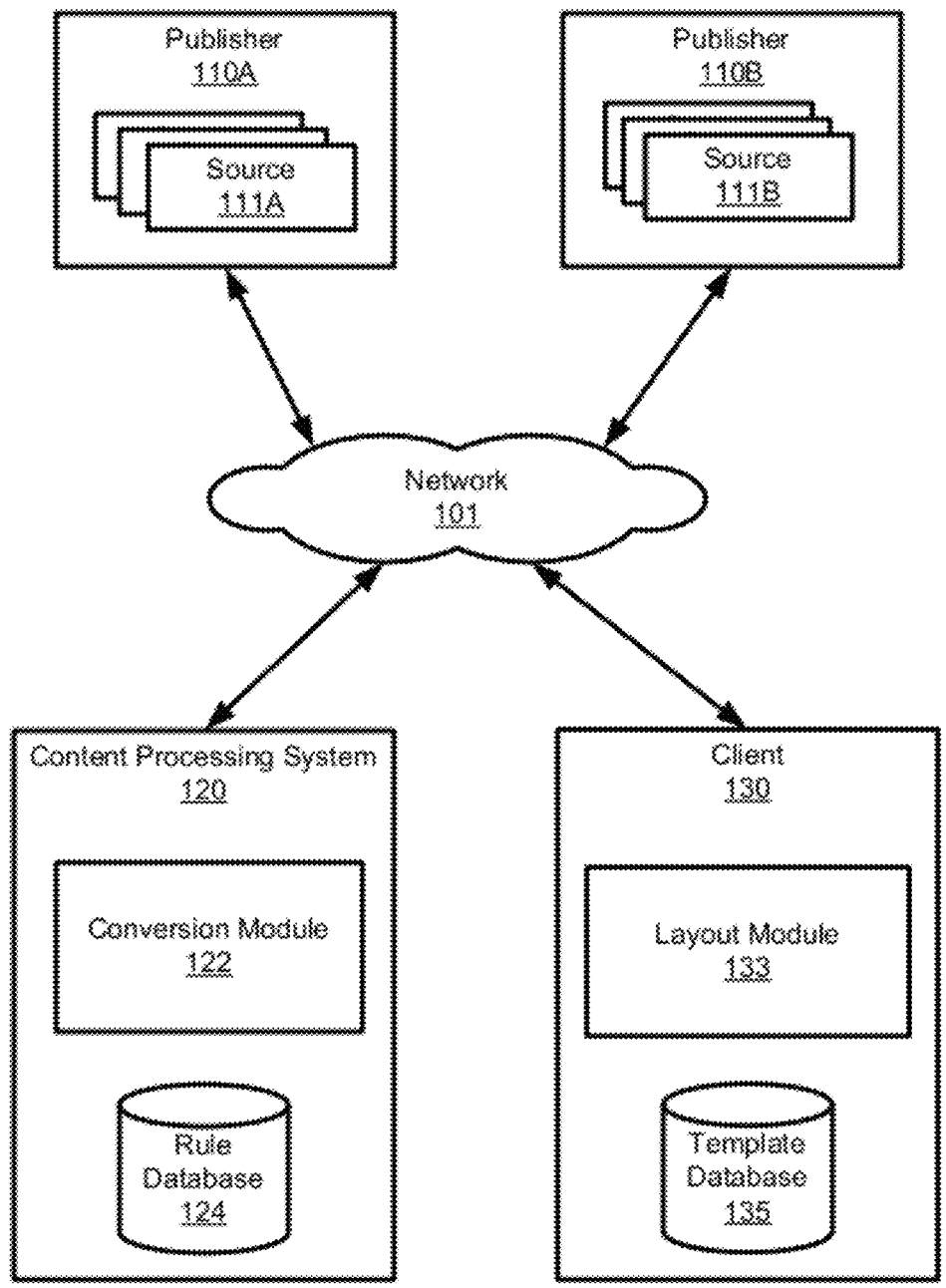
FIG. 1 is a high-level block diagram of a system in accordance with an embodiment of the invention.

The present invention provides various embodiments of systems, methods, and computer-readable storage media for performing layout of web content based on templates. FIG. 1 is a high-level block diagram of a system environment in accordance with one embodiment. The system environment includes at least one publisher 110A, 110B, a content processing system 120, and a client 130 connected via a network 101, such as the Internet.

A publisher 110, such as publishers 110A and 110B, are any systems configured to publish web content such as text, images, video, or audio on web pages, web feeds, or other distribution platforms. For convenience, each article of web content, regardless of its composition, with be referred to herein as a "source" 111. In the example of FIG. 1, each publisher 110A, 110B is shown to have multiple sources 111A, 111B respectively, illustrative of the fact that each can publish, for example, hundreds, even thousands of web pages on their respective systems. Each source comprises a combination of one or more assets, where each asset is of a particular asset type. The asset types include title, subtitle, byline, dateline, pull quote, image, video, audio, caption, and in-line text. A source can be formed in any type of coding language, such as a markup language (e.g., HTML), procedural code (e.g., Javascript), script language (e.g. Python), a page description language (e.g., Acrobat), and so forth, or a combination thereof.

In operation, a client 130 makes a request to the content processing system 120 for various sources 111 from the publisher 110. The content processing system 120 retrieves the source 111 from the publisher 110 via the network 101. As the sources 111 come from any variety of publishers 110, they will be formatted in a wide variety of different manners, as different publishers will use different formatting conventions defining the look of their content. As a very simple example, one publisher may use a very formal 20 point serif font for titles, 14 point font for headings, and 12 point font for body text, whereas a different publisher may use a fancy 24 point sans-serif font for titles, and use a 12 point font for both headings and titles. More significantly, because of the variety of coding languages, different publishers may define and implement entirely different tags or other coding conventions for describing their sources and the assets of their sources.

To accommodate the many and varied types of sources, the content processing system 120 restructures each retrieved source 111 and its assets into a standardized markup language description before providing it to the client. For this purpose, the content processing system 120 includes a conversion module 122 and a rule database 124, which is one means for performing this function. The conversion module 122 undertakes a semantic analysis of the source 111 based on rules present in the rule database 124, and breaks the source 111 down into individual assets. The rules database 124 contains the rules applicable to determining the asset type for each asset based on coding information (e.g., tags, commands, data structures) used in the source 111 to describe the assets. Accordingly, the conversion module 122 converts a received source 111 into a representation of the source that has each asset of the source tagged with an asset type. The tagging of asset types serves to standardize the way assets are described in each source. More particularly, the rules provide a mapping from many different ways that assets in appear across multiple publishers into a smaller, more discrete set of asset types, such as those listed above. It is noted that the amount of restructuring needed may vary widely by source. If a source already conforms to a standardized format when received by the conversion module 122, then little or no restructuring need be done. Otherwise, the conversion module 122 applies the rules of rule database 124.

For example, the content processing system 120 that receives the HTML of a source article having a title, a byline, an image, and a caption is tagged with the appropriate type for each of the assets of the source article by applying the rules of the rule database 124. For example, a rule in the rule database 124 may be that the first H1 tag in an HTML document is considered the title of the article. If a source contains an H1 tag, then the rule is applied to extract the title. As another example, a rule in the rule database 124 may be that the text immediately following an image that starts with the word "Caption:" is the caption of the image. In one embodiment, extraneous formatting instructions and original HTML tags that are not used to represent content in the templates are ignored and stripped from the HTML of the source article during the conversion. The conversion rules can include both generic rules that apply to sources independently of the publisher, as well as publisher specific rules.

The client 130 receives from the content processing system 110 the restructured source 111 that has been tagged with the asset types, and uses the restructured source 111 to select templates for displaying the source. In this example, the client 1130 includes a layout module 133 and a template database 135. In one implementation, the layout module 133 can be a JavaScript layout engine. The layout module 133 interprets the representation of the source 111 that has been tagged with the asset types, determines a template from the template database 135 to use for the layout of the assets of the source, and lays out the assets of the source based on the selected template. The templates allow assets of the source to be laid out over one or multiple pages in a manner that presents a visually appealing design. Templates that contribute to a visually appealing design include templates that accommodate a variety of assets (not only text), optimize white space on a page, ensure that page breaks do not cut through images, minimize orphaned text and headlines, and are sized appropriately for the display device to avoid horizontal or vertical scrolling. The operation of the layout module will be described in more detail below, with reference to FIGS. 3-9B.

Thus, from the viewpoint of a user of the client 130, web content from publishers is automatically rendered in an appropriately paginated layout for the user's enjoyment. From the viewpoint of a publisher 110, the problem of managing the user's visual experience of their content on an unknown output device is eliminated.

As an alternative to the example architecture illustrated in FIG. 1, the template database 135 and layout module 133 may be located on a server on the network 101 instead of on the client 130. When the client device requirements are known by the server in advance, the server can perform the page layout functions in advance, and serve the resulting pages to the client 130. This architecture has the advantages inherent in preparing the layouts in advance. Namely, the ultimate delivery of the layout pages to the client is faster than when the client performs the layout after receiving the content. Also, when layouts are prepared in advance of being requested, slower performing layout algorithms can optionally be used without negatively impacting the reader's experience. It is noted that some slower performing layout algorithms provide better quality layouts than some faster performing layout algorithms. Thus, the quality of the layout may be improved by using a slower performing layout algorithm.

Page Templates

Figure 2:
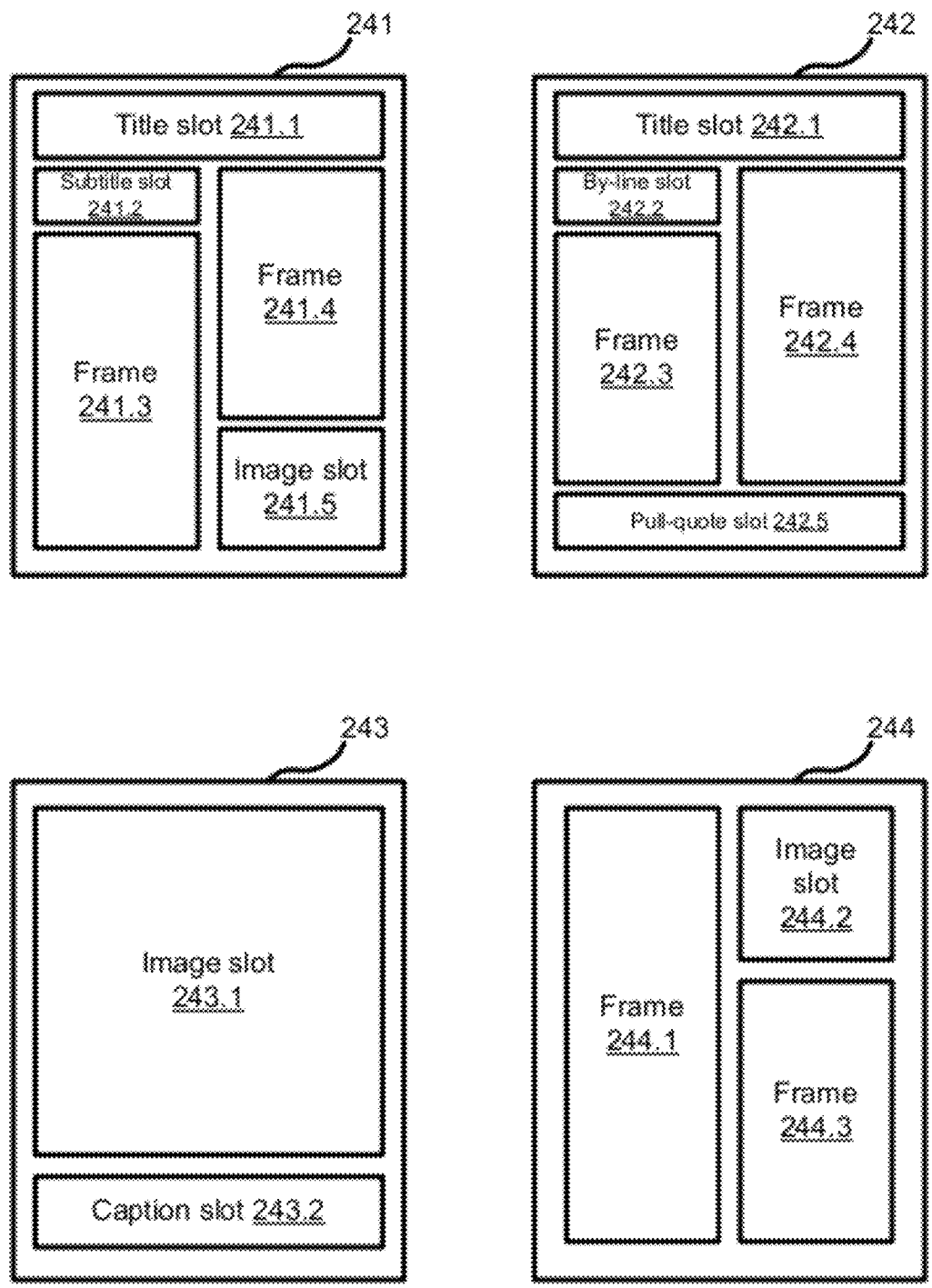
FIG. 2 illustrates four example templates of a set of templates, each having a different set of slots and/or frames for assets of a source, in accordance with an embodiment.

A page template describes a spatial arrangement ("layout") by which the assets of a source are arranged for presentation on a display device. A template is comprised of slots and frames. FIG. 2 illustrates four example page templates 241-244 of a set of templates, each having a different set of slots and/or frames for assets of a source 111, in accordance with an embodiment. These templates are examples of the templates that may be included in the template database 135 residing on the client 130. The templates may be written, for example, in HTML5. The templates in the template database 135 of the client 130 may share characteristics that make each of them appropriate for use in laying out content for display on the client 130, such as overall dimensions, and dimensions of slot types and frames. The templates may be client-device specific. For example, the templates stored in a template database 135 on an iPad® tablet computer from Apple Inc., of Cupertino, Calif., have dimensions such that when content is displayed according to any of the templates on the device, the content is presented as a single readable page, without the need for scrolling; content that is longer than the available space on a page is flowed over to another page. The templates included in a template database 135 of a client device that has different display characteristics may be different.

In one implementation, a common set of templates in the template database 135 is used for all publishers. In another implementation, each publisher 110 has a set of templates that the publisher has approved for use for the respective publisher's sources 111. This allows the publisher 110 to retain influence on the ultimate look and feel of the source 111 as presented on a page to the consumer, i.e., the user of the client 130. For example, a distinctive layout of titles and bylines may be maintained for all articles for a publisher's online magazines. In another variation, each publisher approves the use of a set of templates on a per source basis. For example, a publisher may have particular instructions for the positioning of text and images for a popular blogger, in order to retain consistency in presentation to users. Generally, however, the templates in the template database 135 are reusable for various sources 111 and across various publishers 110 for efficiency. For example, the template database 135 may contain on the order of one hundred templates, and each publisher 110 may approve the use of a set of ten for their respective sources, wherein the sets of ten might not be mutually exclusive.

The example page templates 241, 242, 243, and 244 shown in FIG. 2 illustrate various combinations of slots and frames including slot for titles 241.1, 242.1; subtitles 241.2; images 241.5, 243.1, 244.2; by-lines 242.2; pull-quotes 242.5; captions 243.2; and frames 241.3, 241.4, 242.3, 242.4, 244.1, 244.3 for text content (where X.Y indicates template.position). In this example, each slot holds space for one asset of the type that the name of the slot implies (e.g., one image in "image slot" 243.1), and each frame holds space for text and/or other in-line content such as tables, figures, in-line images, in-line video, and in-line audio. Other templates having other combinations of slots for these or other asset types are also present in the template database 135.

In one implementation, templates that have multiple slots of the same type or multiple frames (such as template 241 having frames 241.3 and 241.4) include sequential numbering of those multiple slots of the same type or multiple frames. The sequential numbering of the multiple slots of the same type or multiple frames aids the layout module 133 in filling the slots or frames in order. In various implementations, the templates may carry an indication of being suitable for certain types of sources, such as being the front page of an article, being able to accommodate an image in landscape orientation, being able to accommodate an image in portrait orientation, being able to accommodate a slide show, and the like. Such indications can be used to group or filter templates as described below with reference to FIG. 3.

Selecting and Using Page Templates

Figure 3:
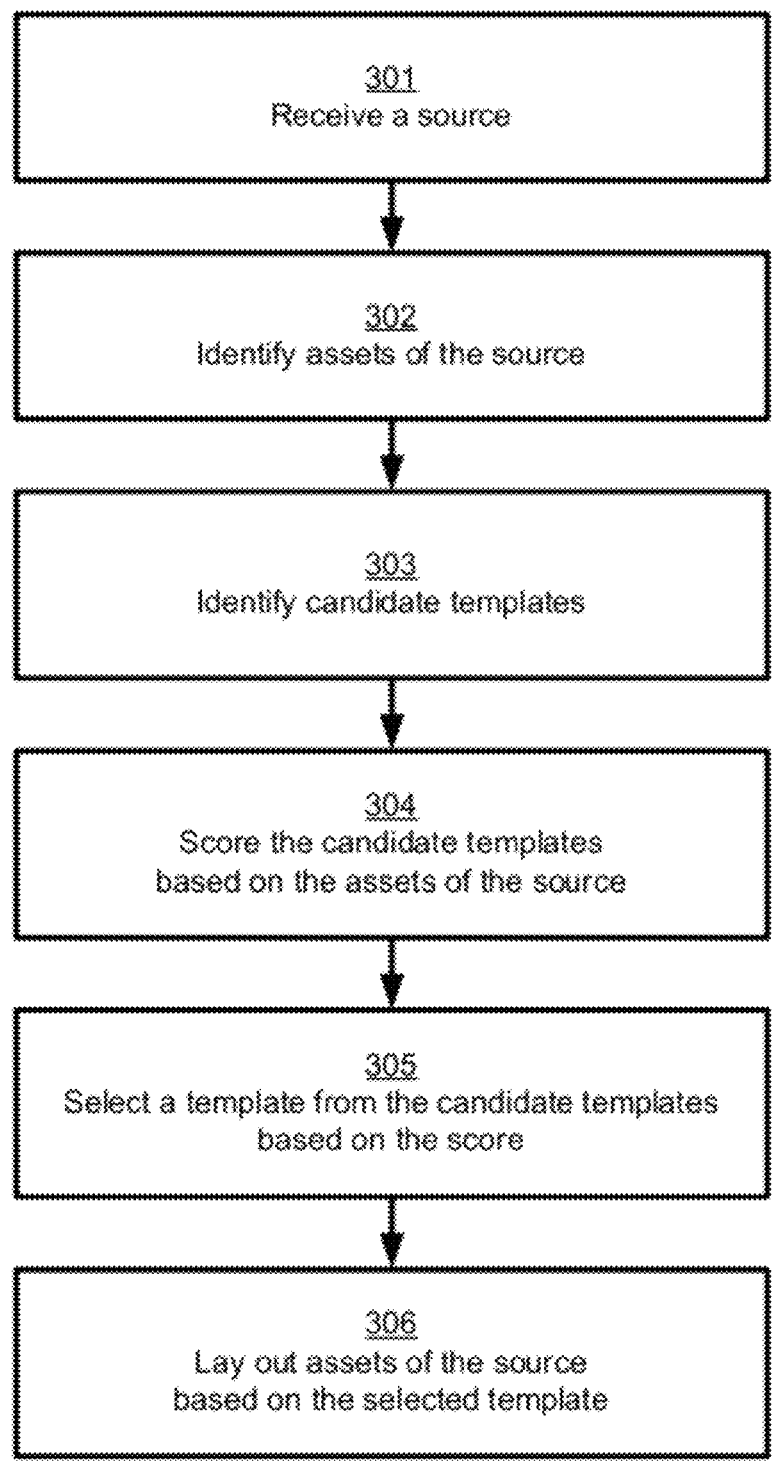
FIG. 3 is a flow chart of a method of selecting a template for a source, in accordance with an embodiment.

FIG. 3 is a flow chart of a method of selecting a template for a source, for example source 111, in accordance with an embodiment. This method may be implemented, for example, by the layout module 133 of the client 130. The method may be performed using a different sequence or combination of steps than illustrated here, and may be performed concurrently in multiple threads.

In step 301, a source 111 is received by the layout module 133 of the client 130. The source 111 has already been processed by the content processing system 120, as described above, by which the conversion module 122 restructured the source 111 into a standardized source, wherein each asset of the source 111 was tagged with an asset type according to rules present in the rule database 124.

In step 302, the assets of the source 111 are identified. The layout module 133 of the client 130 interprets the tagged asset types of the source 111 to determine a list of the assets of the source 111. The list of assets is maintained in local memory in the client 130.

In step 303, the candidate templates are identified. In one implementation, the candidate templates are all templates of the template database 135. In another implementation, the candidate templates are the templates that have been approved for use by the specific publisher 110 of the source 111. In yet other implementations, the pool of candidate templates can be further narrowed by grouping or filtering the templates by one or more characteristics of the templates. Then only the candidates in one or more of the groups or the candidates that have passed the one or more filters are considered. For example, for a source having an image asset landscape orientation, the templates may be grouped by whether there is an image slot in landscape orientation. As another example, for a source that is the front page of an article, the templates may be filtered by whether they indicate suitability for the front page of an article.

In step 304, each of the candidate templates is scored based on the assets of the source. More detail regarding one method of scoring the candidate templates based on the assets of the source is described below with reference to FIG. 4. Generally, candidate templates that have slots of the same number and type as the identified assets of the source score better than candidate templates that do not. In one implementation, the score of a candidate template is incremented for every slot it has that matches the type of an asset of the source, and the score is decremented for every slot that it has that does not match a type of an asset of source. In another implementation, bonuses or penalties to the score of a candidate template are assessed based on the number of assets of the source that cannot be accommodated by a candidate template. Additionally or alternatively, the number of times a particular template has been selected can be used to penalize frequently used templates in order to promote using a diversity of layouts for pages. Additionally or alternatively, templates can be scored based on striking a balance between different amounts of assets. For example, if there are more images than frames, favor templates that have more image slots than frames, and vice versa to produce a good paginated flow.

In step 305, a template from the candidate templates is selected based on the score. For example, the highest or best scoring candidate template will be selected from among the scored candidate templates.

In step 306, the assets of the source are laid out based on the selected template. In one embodiment, the sizing and positioning of frames and slots are adjusted to better accommodate the assets being filled in. Each slot and frame of the selected template is filled with a corresponding asset of the source. In the case of multiple slots of the same type, the slots are filled in sequential order based on the numbering of the slots in the template. For images, in one implementation, the image assets are top center aligned and then cropped to lit in the image frame. More detail regarding filling a frame of a template with a text asset is provided below with reference to FIG. 7. In one implementation, any assets of the source that are not accommodated by the selected template are carried over to become the starting assets of the source for the next page to be laid out.

Figure 8:
FIG. 8 is an example of a source (a web page in its native format).
Figure 9A:
FIGS. 9A and 9B illustrate the first two pages of the source of FIG. 8 laid out according to templates, in accordance with an embodiment.
Figure 9B:
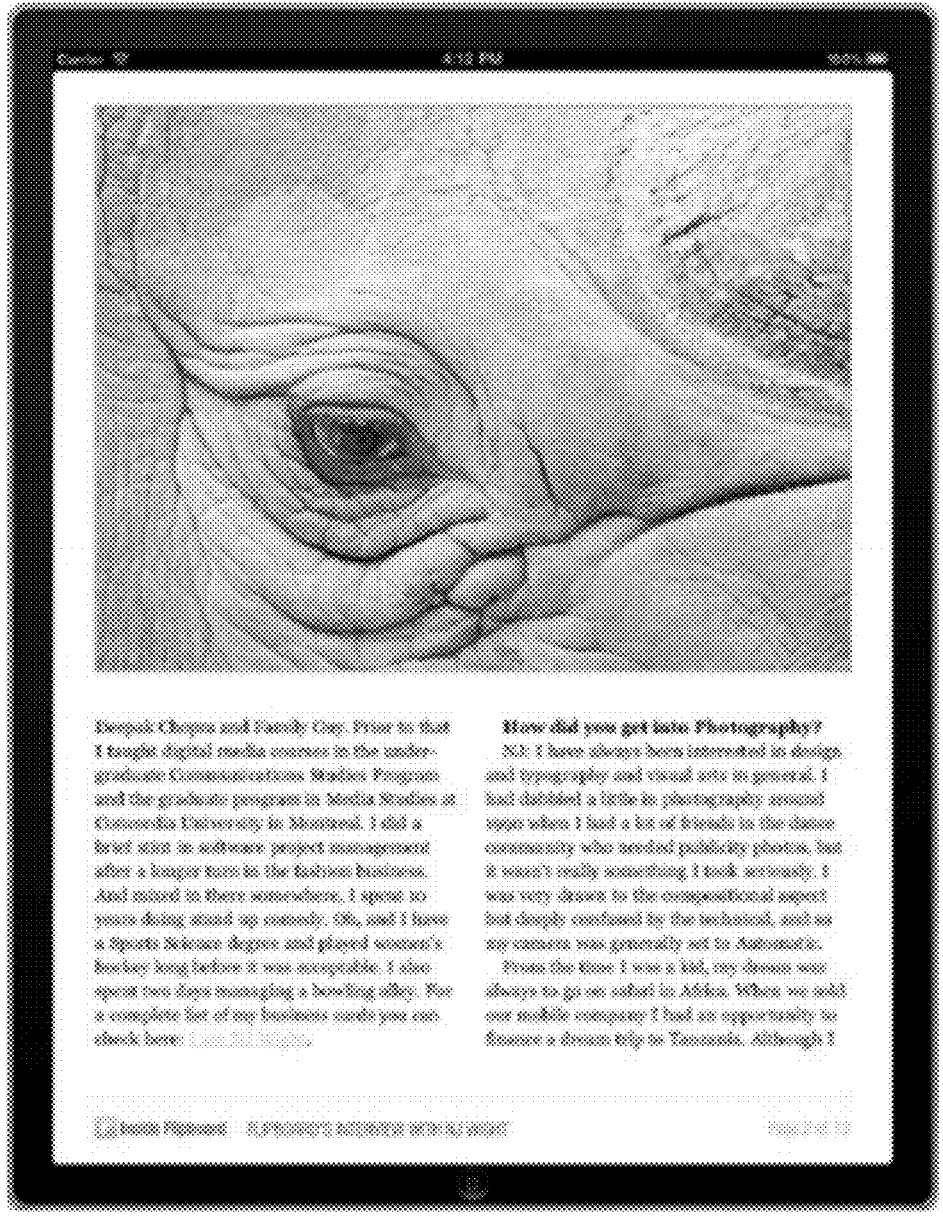

Once a template has been filled it is displayed to the user on the client device 130. An example of a source (a web page in its native format) is provided in FIG. 8. The first two pages of the resulting layout of the source shown in FIG. 8 is demonstrated in FIGS. 9A and 9B as it appears on an iPad® tablet computer.

Optionally, once a layout has been completed, the completed layout may be sent to a server. The server can store the completed layout and any metadata used to identify the layout parameters or client device characteristics used for the layout. This enables the server to subsequently distribute the stored layout to other similar clients. This has the advantage of not requiring extensive server-side infrastructure, while still providing the performance and quality benefits of a layout that is completed in advance.

Figure 4:
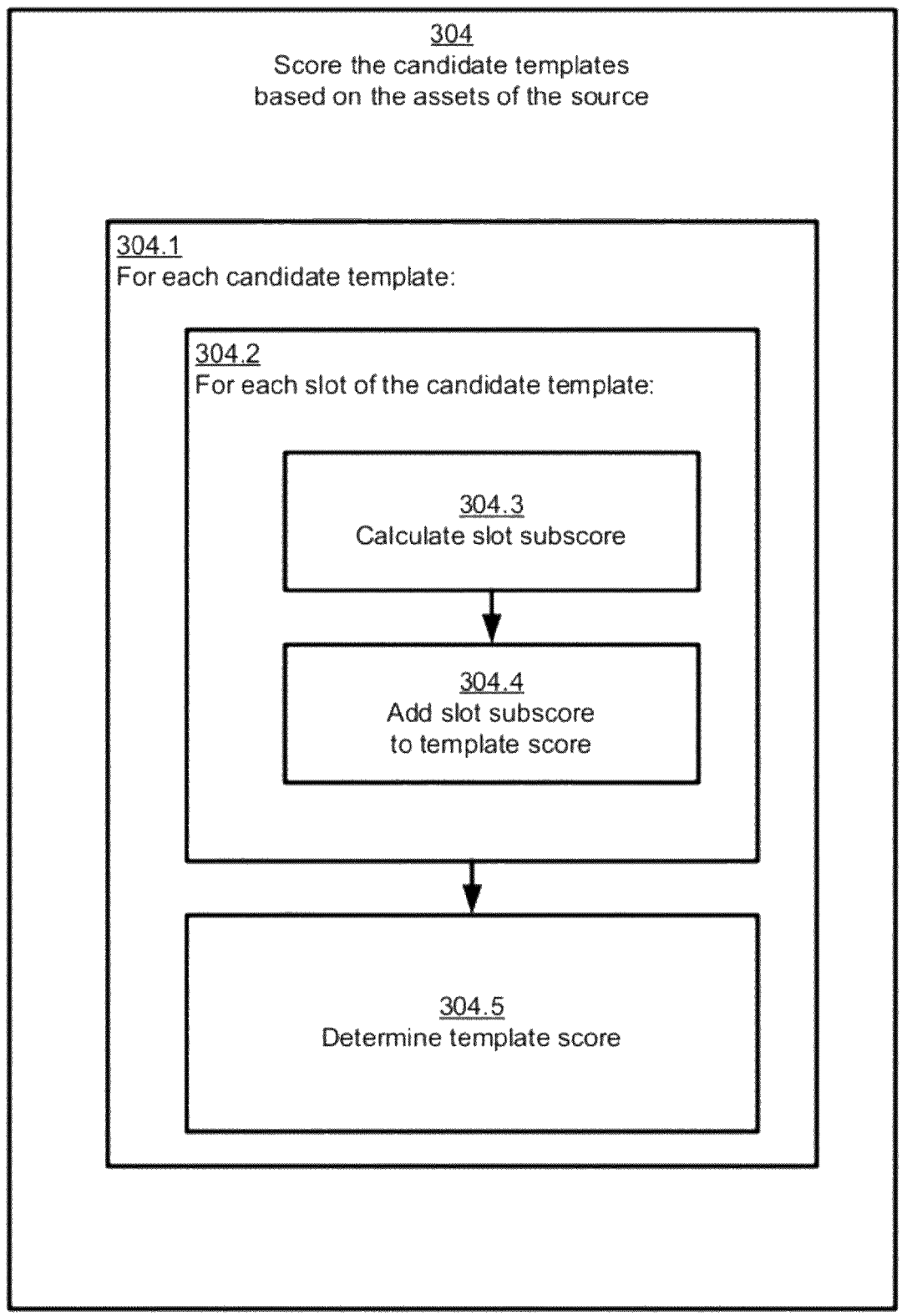
FIG. 4 is a flow chart of a method of scoring the candidate templates based on the assets of a source, in accordance with an embodiment.

FIG. 4 is an illustration of a method of scoring the candidate templates based on the assets of a source, in accordance with an embodiment. Specifically, this diagram illustrates one implementation of step 304 of FIG. 3. In this implementation, the scoring steps are performed for each candidate template 304.1, and within each candidate template, for each slot of the candidate template 304.2. For each slot of the candidate template 304.2, a slot subscore is calculated 304.3. The slot subscore may be an integer, a fraction, or another representation of whether or how well the slot of the template can be filled by an asset of the source.

In some cases, the slot subscores of a template or the template score can be weighted differently depending on the context of the template such as whether the template is for a cover page or an interior page of a magazine. For example, if a template is needed for a cover of a magazine, weight can be added to scores of large image slots or the scores of templates having large image slots, whereas templates that contain text frames may not be scored at all or the scores may be highly discounted.

After the slot subscore is calculated 304.3, the slot subscore is added to the template score in step 304.4. After iterating steps 304.3 and 304.4 across all slots of the candidate template, the template score is determined 304.5 for the candidate. After iterating steps 304.2 and 304.5 across all candidate templates, each candidate template will have a score. In one variation, only slots of a candidate template contribute to the candidate template's score, whereas frames do not. In another variation, both slots and frames contribute to the candidate template's score, and templates that result in a page layout having a large amount of white space because the amount of text of a text asset available to fill a frame is small compared to the size of the frame) are disfavored. Another technique to score frames of a template or the templates themselves is based on how many typographical widows and orphans are present in the frames. Templates that result in a large number of widows and orphans are disfavored compared to templates that enable related text to remain together.

Figure 5:
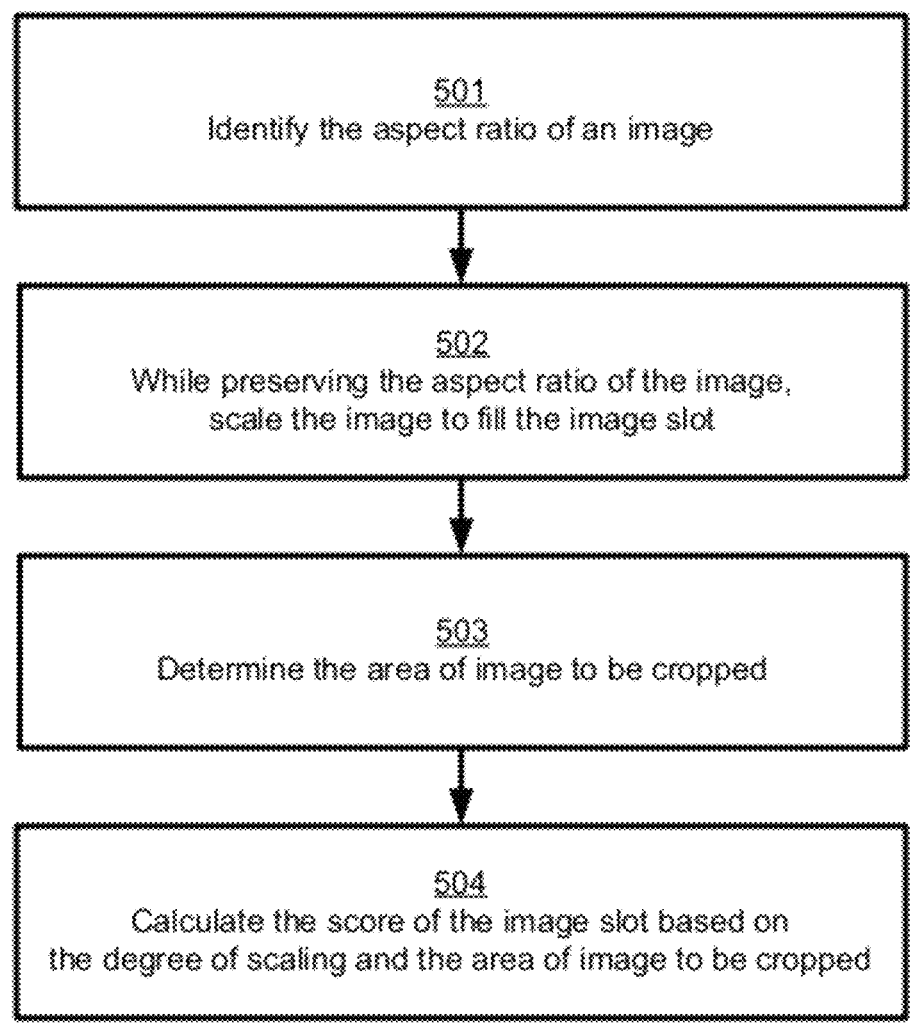
FIG. 5 is a flow chart of a method of scoring an image slot of a candidate template, in accordance with an embodiment.
Figure 6:
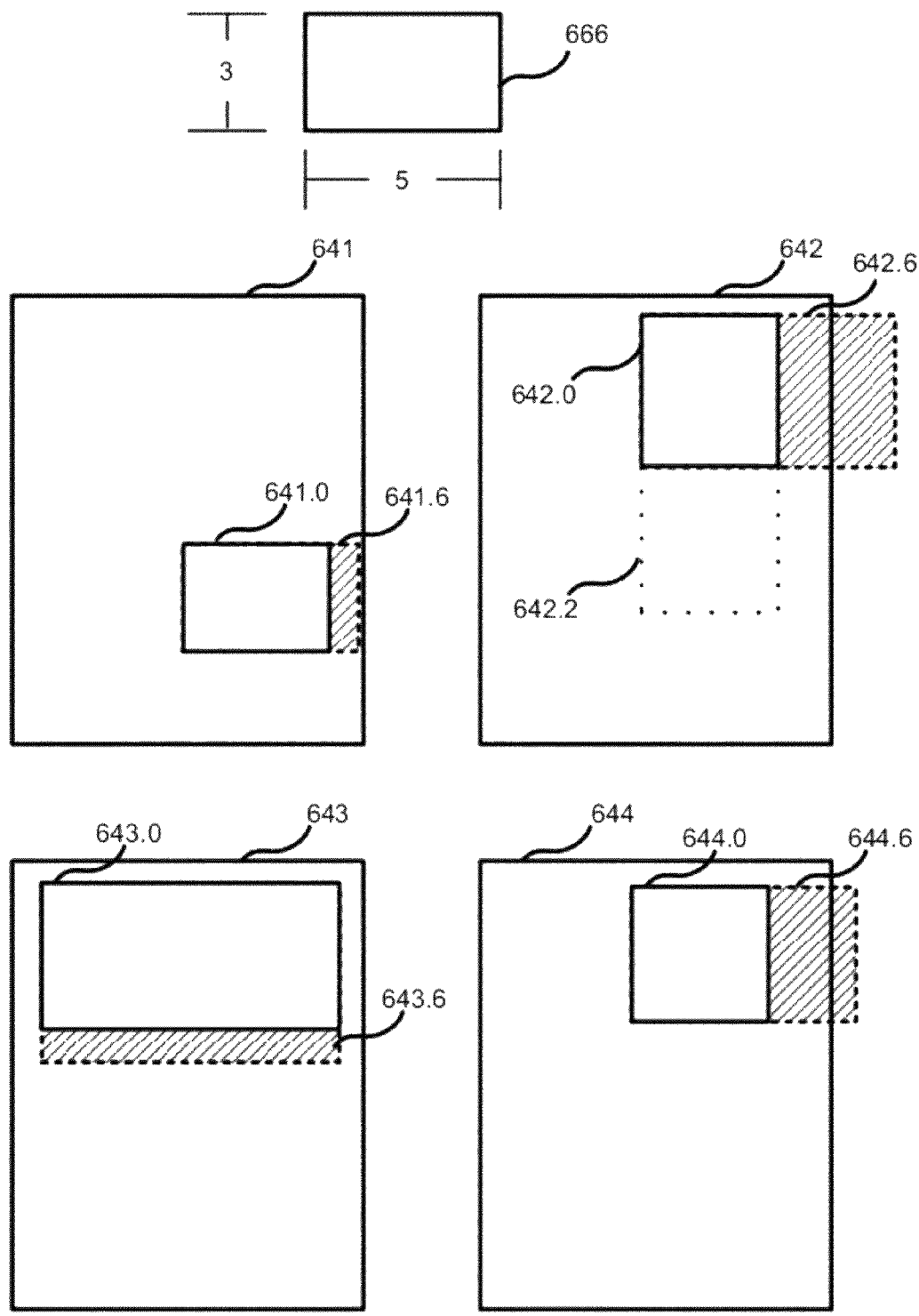
FIG. 6 is an illustration of scoring an image slot by the method described by FIG. 5.

FIG. 5 is a flow chart of a method of scoring an image slot of a candidate template, in accordance with an embodiment. Specifically, this flow chart illustrates one implementation of step 304.3 of FIG. 3 for an instance of an image slot of a candidate template. FIG. 6 is an illustration of scoring an image slot by the method described by FIG. 5.

In step 501, the aspect ratio of the image is identified. In the example illustrated in FIG. 6, the image 666 has an aspect ratio of 5:3.

In step 502, while preserving the aspect ratio of the image, the image is scale to fill the image slot. FIG. 6 illustrates four example templates 641, 642, 643, 644, each containing a respective image slot 641.0, 642.0, 643.0, 644.0. As shown by the examples illustrated in FIG. 6, the result of scaling the image to fill the image slot is that the image will match one dimension of the image slot, and unless a perfect match is attained, the image will exceed the confines of the slot the other dimension. The area of the scaled image that exceeds the confines of the slots 641.0, 642.0, 643.0, 644.0 is shown by the shaded areas 641.6, 642.6, 643.6, 644.6.

In some cases, illustrated here by image slot 642.0 of template 642, the boundary of the image slot may be flexible to better accommodate a wider variety of image aspect ratios and image sizes. In this example, the dotted line 642.2 represents area of the template that can be taken up by expanding the image slot to encompass a greater vertical extent. In this case, the image will be scaled to at least fill the image slot outlined by 642.0, but, if additional vertical area is needed, the image slot could be expanded into a portion or all of the area within the dotted line 642.2. It is noted that the flexible boundary of image slot 642.0 does not guarantee the best score for the image slot 642.0 for template 642. Thus, the steps of the method of FIG. 5 are still undertaken for each image slot of each candidate template to determine the scores, regardless of whether they are flexible image slots.

In step 503, the area of the image to be cropped is determined. The area of the image to be cropped is the area of the scaled image that exceeds the confines of the image slot. The area of the scaled image that exceeds the confines of the slots 641.0, 642.0, 643.0, 644.0 is shown by the shaded areas 641.6, 642.6, 643.6, 644.6.

In step 504, the score of the image slot based on the degree of scaling and the area of the image to be cropped is determined. In general, the less scaling (either up or down) needed to fill the image slot, the better the score. The score may be a linear or non-linear function of the scaling factor. In some cases, it may be beneficial to heavily penalize image slots that require scale factors that are not near 1, because of the degradation of the image quality that is expected when an image is not presented at a size that is close to the original image size. Additionally, the score of the image slot is based on the area of the image to be cropped. The best score in this respect is given to an image slot in which the image can fit without any cropping. In general, the higher the area of the image that can be displayed in the image slot (that does not need to be cropped), normalized as a percentage of the total image area, the better the score. For example, image slot 641.0 scores more highly than image slot 644.0 because area 641.6 is smaller than area 644.6 as a percentage of the total image area. The score of the image slot based on the degree of scaling is combined with the score of the image slot based on the area of the image to be cropped, for example by adding them. Other methods of scoring the image slot based on the degree of scaling and the area of the image to be cropped are also possible.

Alternatively or additionally, the score of an image slot can be affected by a rectangle of importance of an image as indicated by a preprocessing step. The rectangle of importance is a demarcation applied to the image to indicate the most important portion of the image, such as the central feature, figure, or the like, that should not be cropped from the image. For example, the rectangle of importance may surround a face detected in the image using any face detection algorithm known to those of skill in the art. Accordingly, the score of an image slot that accommodates the entirety of the rectangle of importance will be higher than the score of an image slot that requires the image to be cropped inside the rectangle of importance. The scoring of an image slot may be based on how much cropping is performed inside a rectangle of importance. Also, the ultimate positioning of an image in an image slot can be made based on the rectangle of importance.

Filling a Frame of a Template

Figure 7:
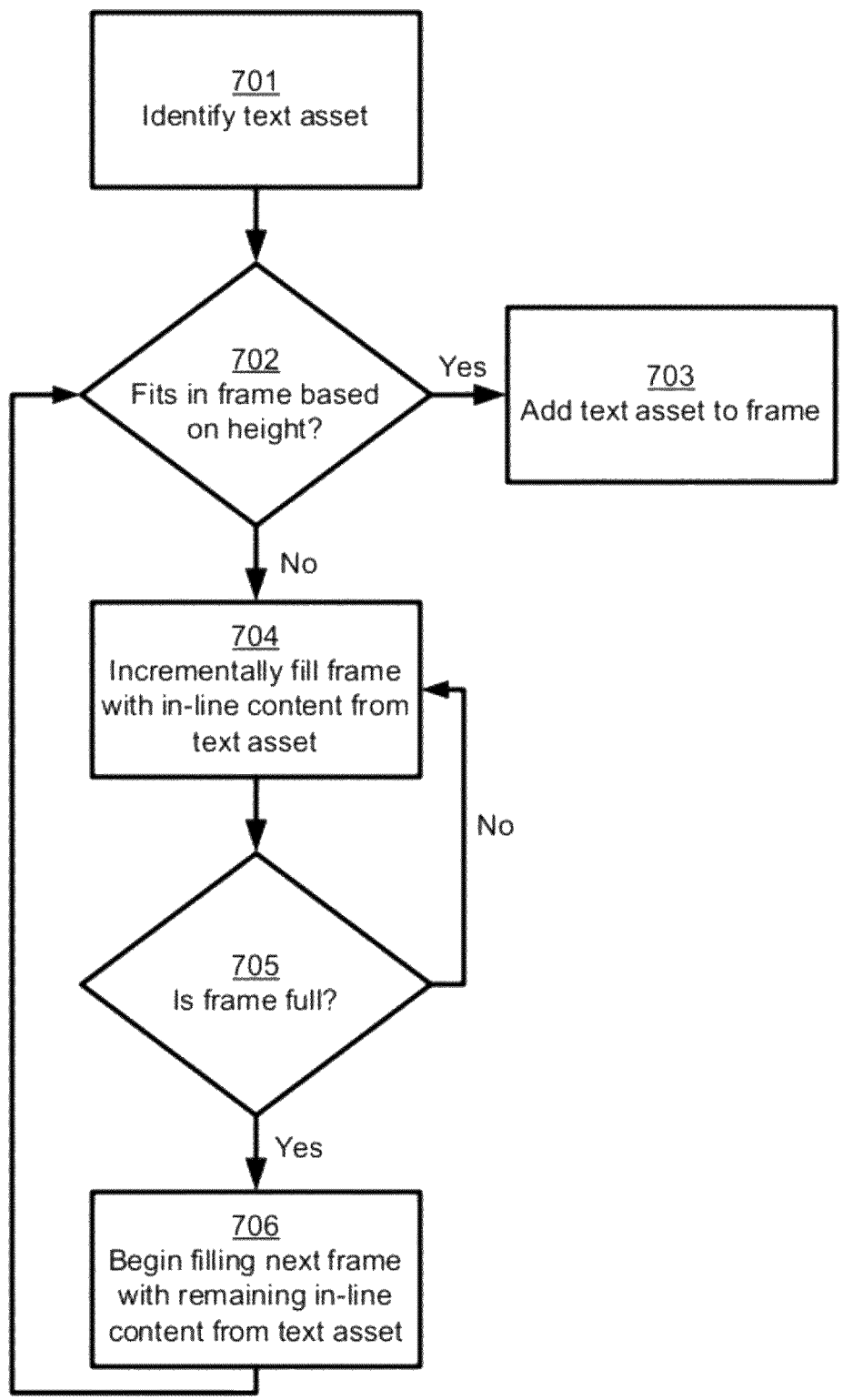
FIG. 7 is a flow chart of a method of adding a text asset to a frame of a template, in accordance with an embodiment.

FIG. 7 is a flow chart of a method of adding a text asset to a frame of a template, in accordance with an embodiment. The method begins in step 701 by identifying the text asset of a source. As described above, the text asset may include words of text organized into paragraphs, as well as tables and other in-line figures, in-line videos, and in-line audio, referred to collectively as in-line content.

In step 702, a check is made to determine if the text asset fits in the frame based on the dimensions of the frame, specifically the height of the frame. If the text asset fits in the frame, then the text asset is added to the frame in step 703. If the text asset does not fit in the frame, then in step 704, the frame is incrementally filled with in-line content from the text asset, until, as determined in step 705, the frame is full. In some cases, the text sizing may be altered to fit inside the frame shrink-to-fit). In other cases, the text size is maintained to ensure format consistency and readability.

As an alternative to step 704, when an entire text asset does not fit in a frame, the length of the text asset in characters is divided approximately in half (respecting word boundaries), and then the first half is tested against the size of the frame to determine if it fits. This step can be iterated until the first portion of the text asset fits, and then iterated to continue filling the frame with the next portion of the text asset, until not another word will fit in the frame.

Once the frame is full, in step 706, the method continues by filling the next frame with the remaining in-line content from the text asset. In this way, the frames of a template are filled sequentially with in-line content from the text asset of the source. If there are no remaining frames within a template for the remaining in-line content, then the remaining in-line content are carried over to begin filling the first frame of a new page template.

Accordingly, the template-based page layout methods described with reference to FIGS. 3-9B allow assets of the source to be laid out over one or multiple pages in a manner that presents a visually appealing design. By scoring templates and selecting the most appropriate one for a given source based on the assets of the source, a variety of web content can be automatically rendered in an engaging layout that enhances the user's enjoyment of the content.

Additional Configuration Considerations

The present invention has been described in particular detail with respect to several possible embodiments. Those of skill in the art will appreciate that the invention may be practiced in other embodiments. For example, the described methods can be used in conjunction with conventional automatic layout algorithms to produce improved layout results. Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing a s to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method for performing client-side page layout of web content using templates, the method comprising:
  receiving a source comprising a plurality of assets of different asset types;
  identifying a plurality of candidate templates from a template database, where each identified candidate template comprises a plurality of slots, and where each slot is configured to receive an asset of a particular asset type;
  for each particular slot of each of the identified candidate templates, calculating a slot subscore by:
    identifying an aspect ratio of an image asset included in the source,
    scaling the image asset to fill the particular slot when the particular slot is an image asset type slot,
    determining an area of the image asset to be cropped based on an area of the scaled image that extends beyond one or more boundaries of the particular slot,
    determining whether the determined area of the image asset to be cropped included a specified area of the image asset that should not be cropped, and
    calculating the slot subscore for the particular slot based at least in part on an amount of cropping to be performed inside the specified area and the determination of whether the determined area of the image asset to be cropped included the specified area;
  determining a score for each of the plurality of identified candidate templates,
    wherein the score for an identified candidate template is determined by:
      aggregating the calculated slot subscores for the plurality of slots included in the identified candidate template, and
      comparing a number and types of slots included in the identified candidate template with a number and types of assets included in the source;
  selecting a particular template from the scored plurality of identified candidate templates based on the scoring; and
  generating a readable article on a client device, the readable article comprising the assets of the source placed in the readable article according to the selected particular template.

2. The method of claim 1, wherein the source comprises web content published by a publisher.

3. The method of claim 2, wherein the identified candidate templates are templates approved by the publisher.

4. The method of claim 1, wherein the identified candidate templates are templates that lay out web content as a single readable page on a display of the client.

5. The method of claim 1, wherein each of the plurality of assets has an asset type selected from a group comprising: title, subtitle, byline, dateline, pull quote, image, video, audio, caption, and in-line text.

6. The method of claim 1, wherein determining a score for each of the identified candidate templates comprises weighting the identified candidate template scores differently depending on context.

7. The method of claim 1, wherein determining a score for each of the identified candidate templates comprises scoring the identified candidate templates based on a balance between types of assets.

8. The method of claim 1, wherein determining a score for each of the identified candidate templates comprises scoring frames of the identified candidate templates based on avoiding typographical widows and orphans.

9. The method of claim 1, wherein generating a readable article on a client device comprises:
  responsive to an entire text asset not fitting in a first frame of the selected particular template:
    incrementally filling the first frame with a text asset until the frame is full; and
    filling a next frame with remaining content from the text asset.

10. The method of claim 1, wherein generating a readable article on a client device comprises:
  responsive to an entire text asset not fitting in a first frame of the selected particular template:
    iteratively dividing a text asset approximately in half and testing whether the first half fits in the first frame until a first portion of the text asset fits in the first frame; and
    repeating the dividing step with a remaining portion of the text asset until not another word of the text asset fits in the first frame.

11. The method of claim 1, further comprising sending the layout to a server for subsequent distribution to other clients.

12. A computer program product comprising a non-transitory computer-readable storage medium containing computer program code for performing client-side page layout of web content using templates, the code for:
  receiving a source comprising a plurality of assets of different asset types;
  identifying a plurality of candidate templates from a template database, where each identified candidate template comprises a plurality of slots, and where each slot is configured to receive an asset of a particular asset type;
  for each particular slot of each of the plurality of identified candidate templates, calculating a slot subscore by:
    identifying an aspect ratio of an image asset included in the source,
    scaling the image asset to fill the particular slot when the particular slot is an image asset type slot,
    determining an area of the image asset to be cropped based on an area of the scaled image that extends beyond one or more boundaries of the particular slot,
    determining whether the determined area of the image asset to be cropped included a specified area of the image asset that should not be cropped, and
    calculating the slot subscore for the particular slot based at least in part on an amount of cropping to be performed inside the specified area and the determination of whether the determined area of the image asset to be cropped included the specified area;
  determining a score for each of the plurality of identified candidate templates, wherein the score for an identified candidate template is determined by:
    aggregating the calculated slot subscores for the plurality of slots included in the identified candidate template, and,
    comparing a number and types of slots included in the identified candidate template with a number and types of assets included in the source;
  selecting a particular template from the scored plurality of identified candidate templates based on the scoring; and
  generating a readable article on a client device, the readable article comprising the assets of the source placed in the readable article according to the selected particular template.

13. The computer program product of claim 12, wherein the source comprises web content published by a publisher.

14. The computer program product of claim 12, wherein the identified candidate templates are templates approved by the publisher.

15. The computer program product of claim 12, wherein the identified candidate templates are templates that lay out web content as a single readable page on a display of the client.

16. The computer program product of claim 12, wherein each of the plurality of assets has an asset type selected from a group comprising: title, subtitle, byline, dateline, pull quote, image, video, audio, caption, and in-line text.

17. The computer program product of claim 12, wherein determining a score for each of the identified candidate templates comprises weighting the identified candidate template scores differently depending on context.

18. The computer program product of claim 12, wherein determining a score for each of the identified candidate templates comprises scoring the identified candidate templates based on a balance between types of assets.

19. The computer program product of claim 12, wherein determining a score for each of the identified candidate templates comprises scoring frames of the identified candidate templates based on avoiding typographical widows and orphans.

20. The computer program product of claim 12, wherein generating a readable article on a client device comprises:
  responsive to an entire text asset not fitting in a first frame of the selected particular template:
    incrementally filling the first frame with a text asset until the frame is full; and
    filling a next frame with remaining content from the text asset.

21. The computer program product of claim 12, wherein generating a readable article on a client device comprises:
  responsive to an entire text asset not fitting in a first frame of the selected particular template:
    iteratively dividing a text asset approximately in half and testing whether the first half fits in the first frame until a first portion of the text asset fits in the first frame; and
    repeating the dividing step with a remaining portion of the text asset until not another word of the text asset fits in the first frame.

22. The computer program product of claim 12, the code further comprising code for sending the layout to a server for subsequent distribution to other clients.

23. A method for performing page layout of web content based on templates, the method comprising:
  receiving a source comprising a plurality of assets of different asset types;
  for each asset included in the source, determining an asset type based on coding information included in the source;
  identifying a plurality of candidate templates from a template database, where each identified candidate template comprises a plurality of slots, and where each slot is configured to receive an asset of a particular asset type;
  for each particular slot of each of the plurality of identified candidate templates, calculating a slot subscore by:
    identifying an aspect ratio of an image asset included in the source,
    scaling the image asset to fill the particular slot when the particular slot is an image asset type slot,
    determining an area of the image asset to be cropped based on an area of the scaled image that extends beyond one or more boundaries of the particular slot,
    determining whether the determined area of the image asset to be cropped included a specified area of the image asset that should not be cropped, and
    calculating the slot subscore for the particular slot based at least in part on an amount of cropping to be performed inside the specified area and the determination of whether the determined area of the image asset to be cropped included the specified area;
  determining a score for each of the plurality of identified candidate templates, wherein the score for an identified candidate template is determined by:
    aggregating the calculated slot subscores for the plurality of slots included in the identified candidate template, and
    comparing a number and types of slots included in the identified candidate template with a number and types of assets included in the source;
  selecting a particular template from the scored plurality of identified candidate templates based on the scoring;
  generating a readable article for display on a client device, the readable article comprising the assets of the source placed in the readable article according to the selected particular template; and
  serving the generated readable article to the client device for display.

24. A computer program product comprising a non-transitory computer-readable storage medium containing computer program code for performing page layout of web content using templates, the code for:
  receiving a source comprising a plurality of assets of different asset types;
  identifying a plurality of candidate templates from a template database, where each identified candidate template comprises a plurality of slots, and where each slot is configured to receive an asset of a particular asset type;
  for each particular slot of each of the plurality of identified candidate templates, calculating a slot subscore by:
    identifying an aspect ratio of an image asset included in the source,
    scaling the image asset to fill the particular slot when the particular slot is an image asset type slot,
    determining an area of the image asset to be cropped based on an area of the scaled image that extends beyond one or more boundaries of the particular slot,
    determining whether the determined area of the image asset to be cropped included a specified area of the image asset that should not be cropped, and
    calculating the slot subscore for the particular slot based at least in part on an amount of cropping to be performed inside the specified area and the determination of whether the determined area of the image asset to be cropped included the specified area;
  determining a score for each of the plurality of identified candidate templates, wherein the score for an identified candidate template is determined by:
    aggregating the calculated slot subscores for the plurality of slots included in the identified candidate template, and,
    comparing a number and types of slots included in the identified candidate template with a number and types of assets included in the source;
  selecting a particular template from the scored plurality of identified candidate templates based on the scoring;
  generating a readable article for display on a client device, the readable article comprising the assets of the source placed in the readable article according to the selected particular template; and
  serving the generated readable article to the client device for display.

* * * * *